(12) United States Patent
Han et al.

(10) Patent No.: US 11,240,700 B2
(45) Date of Patent: Feb. 1, 2022

(54) COMMUNICATION METHOD AND ACCESS NETWORK DEVICE

(71) Applicant: HUAWEI TECHNOLOGIES CO., LTD., Guangdong (CN)

(72) Inventors: Feng Han, Shanghai (CN); Yinghao Jin, Shanghai (CN); Hong Li, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 115 days.

(21) Appl. No.: 16/714,270

(22) Filed: Dec. 13, 2019

(65) Prior Publication Data

US 2020/0120538 A1 Apr. 16, 2020

Related U.S. Application Data

(63) Continuation of application No. PCT/CN2018/090830, filed on Jun. 12, 2018.

(30) Foreign Application Priority Data

Jun. 16, 2017 (CN) .......................... 201710459520.2

(51) Int. Cl.
*H04W 28/02* (2009.01)
*H04W 76/15* (2018.01)

(52) U.S. Cl.
CPC ... *H04W 28/0268* (2013.01); *H04W 28/0257* (2013.01); *H04W 28/0263* (2013.01); *H04W 76/15* (2018.02)

(58) Field of Classification Search
CPC ............. H04W 28/0268; H04W 76/15; H04W 28/0257; H04W 28/0263
See application file for complete search history.

(56) References Cited

U.S. PATENT DOCUMENTS

2018/0270713 A1* 9/2018 Park .................. H04W 74/0833
2018/0279229 A1* 9/2018 Dinan ................. H04W 52/367
(Continued)

FOREIGN PATENT DOCUMENTS

| CN | 103596213 A | 2/2014 |
| WO | 2013155846 A1 | 10/2013 |
| WO | 2015063587 A2 | 5/2015 |

OTHER PUBLICATIONS

3GPP TS 38.423 V0.1.0 (May 2017), "3rd Generation Partnership Project; Technical Specification Group Radio Access Network; NG Radio Access Network (NG-RAN); Xn aication protocol (XnAP) (Release15)," May 2017, 53 pages.
(Continued)

*Primary Examiner* — Ajay Cattungal
(74) *Attorney, Agent, or Firm* — Fish & Richardson P.C.

(57) ABSTRACT

Example communication methods and an access network device are described. One example method includes sending a first message to a second access network device by a first access network device, where the first message carries a quality of service (QoS) flow identification (QFI) for a split bearer corresponding to the first access network device and a QoS parameter corresponding to the QFI. The second access network device receives the first message from the first access network device, where the first message carries the QFI for the split bearer corresponding to the first access network device and the QoS parameter corresponding to the QFI. The second access network device sends a second message to the first access network device, where the second message is a response to the first message. The embodiments of this application are used to implement QoS control.

16 Claims, 8 Drawing Sheets

(56) References Cited

U.S. PATENT DOCUMENTS

2018/0376445 A1* 12/2018 Yoon ................. H04W 8/20
2019/0394830 A1* 12/2019 Mildh ............... H04W 52/0258
2020/0396651 A1* 12/2020 Wang ............... H04W 36/0044

OTHER PUBLICATIONS

3GPP TS 38.300 V0.4.1 (Jun. 2017), "3rd Generation Partnership Project; Technical Specification Group Radio Access Network; NR; NR and NG-RAN Overall Description; Stage 2 (Release 15)," Jun. 2017, 55 pages.
Ericsson, "QoS stage 3 related aspects," 3GPP TSG-RAN WG3 Meeting #95bis, R3-171138, Spokane, WA, USA, Apr. 3-7, 2017, 3 pages.
Ericsson, "QoS—stage 3 related aspects—TP for NGAP and XnAP," 3GPP TSG-RAN WG3 Meeting #95bis, R3-171347, Spokane, WA, USA, Apr. 3-7, 2017, 3 pages.
Extended European Search Report issued in European Application No. 18818256.2 dated May 6, 2020, 9 pages.
Huawei et al., "QoS Flow ID in SDAP," 3GPP TSG-RAN WG2 Meeting #98, R2-1704981, Hangzhou, China, May 15-19, 2017, 2 pages.
Huawei, "Support of QoS and Slice for Option 7," 3GPP TSG-RAN WG3 #96, R3-171889, Hangzhou, China, May 15-19, 2017, 5 pages.
PCT International Search Report and Written Opinion issued in International Application No. PCT/CN2018/090830 dated Aug. 21, 2018, 17 pages (with English translation).

* cited by examiner

COMMUNICATION METHOD AND ACCESS NETWORK DEVICE

CROSS-REFERENCE TO RELATED APPLICATIONS

This application is a continuation of International Application No. PCT/CN2018/090830, filed on Jun. 12, 2018, which claims priority to Chinese Patent Application No. 201710459520.2, filed on Jun. 16, 2017. The disclosures of the aforementioned applications are hereby incorporated by reference in their entireties.

TECHNICAL FIELD

This application relates to the field of communications technologies, and in particular, to a communication method and an access network device.

BACKGROUND

A 5th generation (5th-generation, 5G) mobile communications system supports various types of network deployment and application types, including an access capability with higher-rate experience and higher bandwidth, highly reliable information exchange with a lower delay, and access and management of larger-scale low cost machine type (machine-type communication, MTC) devices. To meet the requirements, the 5G system defines a QoS flow (flow)-based quality of service (quality of service, QoS) framework, and the framework supports a guaranteed flow rate QoS flow and a non-guaranteed flow rate QoS flow.

A reflective QoS mechanism is introduced to the 5G system, and is a method for obtaining an uplink data transmission QoS rule by a terminal device. A basic idea of the mechanism is that the terminal device derives the uplink data transmission QoS rule based on a downlink data packet.

In the 5G system, how to implement QoS control is a problem to be considered.

SUMMARY

To resolve a technical problem, embodiments of this application provide a communication method and an access network device, so as to implement QoS control.

According to a first aspect, an embodiment of this application provides a communication method, including:

Step 1: A first access network device sends a first message to a second access network device, where the first message carries a QFI for a split bearer corresponding to the first access network device and a QoS parameter corresponding to the QFI.

Step 2: The first access network device receives a second message from the second access network device, where the second message is a response to the first message.

According to a second aspect, an embodiment of this application provides a communications apparatus, including a unit or a means (means) configured to perform the steps in the first aspect.

According to a third aspect, an embodiment of this application provides a communications apparatus, including at least one processing element and at least one storage element, where the at least one storage element is configured to store a program and data, and the at least one processing element is configured to perform the method provided in the first aspect of the embodiments of this application.

According to a fourth aspect, an embodiment of this application provides a communications apparatus, including at least one processing element (or chip) configured to perform the method in the first aspect.

According to a fifth aspect, an embodiment of this application provides a communication method program, where when the program is executed by a processor, the program is used to perform the method in the first aspect.

According to a sixth aspect, an embodiment of this application provides a program product, for example, a computer readable storage medium, including the program in the fifth aspect.

It can be learned that, in all the foregoing aspects, for a GBR QoS flow transmitted between a core network and a primary base station, the primary base station implements centralized control over the GBR QoS flow, and a GBR QoS performance requirement is finally met. Specifically, for a same GBR QoS flow, the primary base station effectively ensures QoS for a GBR QoS flow part transmitted between the primary base station and UE, and a secondary base station effectively ensures QoS for a QoS flow part transmitted between the secondary base station and the UE. The secondary base station may perform effective radio resource management at the secondary base station based on these GBR QoS parameters, and further ensure performance of the GBR QoS parameter through air interface resource scheduling, logical channel priority scheduling at a radio link layer, and the like.

With reference to the first aspect to the sixth aspect, in a possible implementation, the QoS parameter corresponding to the QFI for the split bearer corresponding to the first access network device includes a GBR QoS parameter, and the GBR QoS parameter includes a guaranteed flow bit rate GFBR that the second access network device needs to meet and a maximum bit rate MFBR that the second access network device needs to meet.

With reference to the first aspect to the sixth aspect, in a possible implementation, the first message further carries a mapping relationship between a bearer and/or a split bearer corresponding to the first access network device and a QoS parameter.

With reference to the first aspect to the sixth aspect, in a possible implementation, the first message further carries a to-be-switched QFI and a QoS parameter corresponding to the to-be-switched QFI.

The secondary base station may independently determine, based on the to-be-switched QFI and the QoS parameter corresponding to the to-be-switched QFI, whether to establish an SCG bearer or an SCG split bearer, and this is different from a case in which the primary base station makes a final decision for the secondary base station. The secondary base station may independently determine whether to establish one bearer or establish a plurality of bearers, and may also independently determine a mapping relationship between a QoS flow and an SCG bearer or an SCG bearer, so that the secondary base station can meet a QoS parameter requirement to a greatest extent based on a load status of the secondary base station, a QoS parameter, a channel condition, and the like, thereby improving final user experience.

In addition, based on the first message, the secondary base station may preferably use a same bearer configuration and a same configuration relationship between a QoS flow and a bearer as the primary base station, to avoid a case in which flows are out of order. For a TCP-based service, an invalid TCP congestion avoidance mechanism is avoided, thereby improving a user throughput.

With reference to the first aspect to the sixth aspect, in a possible implementation, the second message carries a QFI for a split bearer corresponding to the second access network device and a QoS parameter corresponding to the QFI.

With reference to the first aspect to the sixth aspect, in a possible implementation, the first access network device receives a third message from the second access network device, where the third message carries a QFI for a split bearer corresponding to the second access network device and a QoS parameter corresponding to the QFI.

With reference to the first aspect to the sixth aspect, in a possible implementation, the first access network device performs data transmission based on the QFI for the split bearer corresponding to the second access network device and the QoS parameter corresponding to the QFI.

With reference to the first aspect to the sixth aspect, in a possible implementation, the QoS parameter corresponding to the QFI for the split bearer corresponding to the second access network device includes a GBR QoS parameter, and the GBR QoS parameter includes a GFBR that the first access network device needs to meet and an MFBR that the first access network device needs to meet.

For a GBR QoS flow transmitted between the core network and the secondary base station, the secondary base station implements centralized control over the GBR QoS flow, and a GBR QoS performance requirement is finally met. Specifically, for a same GBR QoS flow, the secondary base station effectively ensures QoS for a GBR QoS flow part transmitted between the secondary base station and the UE, and the primary base station effectively ensures QoS for a QoS flow part transmitted between the primary base station and the UE. In addition, the primary base station may perform effective radio resource management at the primary base station based on these GBR QoS parameters, and further ensure performance of the GBR QoS parameter through air interface resource scheduling, logical channel priority scheduling at the radio link layer, and the like.

According to a seventh aspect, an embodiment of this application provides a communication method, including:

Step 1: A first access network device obtains reflective quality of service QoS capability information of a terminal device, where the reflective QoS capability information indicates that the terminal device has or does not have a reflective QoS capability.

Step 2: The first access network device sends a first message to a second access network device, where the first message carries the reflective QoS capability information of the terminal device.

According to an eighth aspect, an embodiment of this application provides a communications apparatus, including a unit or a means (means) configured to perform the steps in the seventh aspect.

According to a ninth aspect, an embodiment of this application provides a communications apparatus, including at least one processing element and at least one storage element, where the at least one storage element is configured to store a program and data, and the at least one processing element is configured to perform the method provided in the seventh aspect of the embodiments of this application.

According to a tenth aspect, an embodiment of this application provides a communications apparatus, including at least one processing element (or chip) configured to perform the method in the seventh aspect.

According to an eleventh aspect, an embodiment of this application provides a communication method program, where when the program is executed by a processor, the program is used to perform the method in the seventh aspect.

According to a twelfth aspect, an embodiment of this application provides a program product, for example, a computer readable storage medium, including the program in the fifth aspect.

It can be learned that, in all the foregoing aspects, the first access network device may transmit a QFI for a split bearer corresponding to the first access network device and a QoS parameter corresponding to the QFI to the second access network device. In this way, a primary base station can transmit the QoS parameter to a secondary base station.

With reference to the seventh aspect to the twelfth aspect, in a possible implementation, the second access network device performs data transmission based on the QFI for the split bearer corresponding to the first access network device and the QoS parameter corresponding to the QFI.

With reference to the seventh aspect to the twelfth aspect, in a possible implementation, the QoS parameter corresponding to the QFI for the split bearer corresponding to the first access network device includes a GBR QoS parameter, and the GBR QoS parameter includes a GFBR that the second access network device needs to meet and an MFBR that the second access network device needs to meet.

With reference to the seventh aspect to the twelfth aspect, in a possible implementation, the first message further carries a mapping relationship between a bearer and/or a split bearer corresponding to the first access network and a QoS parameter; and the second access network device transmits, by using the mapping relationship between a bearer or a split bearer corresponding to the first access network and a QoS parameter, a QoS flow received from the first access network device.

With reference to the seventh aspect to the twelfth aspect, in a possible implementation, the first message further carries a to-be-switched QFI and a QoS parameter corresponding to the to-be-switched QFI; and the second access network device establishes, based on the to-be-switched QFI and the QoS parameter corresponding to the to-be-switched QFI, a bearer corresponding to the second access network device and a mapping relationship between the bearer corresponding to the second access network device and the QoS parameter corresponding to the to-be-switched QFI.

With reference to the seventh aspect to the twelfth aspect, in a possible implementation, the second access network device sends a second message to the first access network device, where the second message is a response to the first message, and the second message includes a QFI for a split bearer corresponding to the second access network device and a QoS parameter corresponding to the QFI.

With reference to the seventh aspect to the twelfth aspect, in a possible implementation, the second access network device determines to establish a split bearer corresponding to the second access network device; and the second access network device sends a third message to the first access network device, where the third message includes a QFI for the split bearer corresponding to the second access network device and a QoS parameter corresponding to the QFI.

With reference to the seventh aspect to the twelfth aspect, in a possible implementation, the QoS parameter corresponding to the QFI for the split bearer corresponding to the second access network device includes a GBR QoS parameter, and the GBR QoS parameter includes a GFBR that the first access network device needs to meet and an MFBR that the first access network device needs to meet.

A thirteenth aspect of the embodiments of this application further provides a communication method, including:

obtaining, by a first access network device, reflective quality of service QoS capability information of a terminal device, where the reflective QoS capability information indicates that the terminal device has or does not have a reflective QoS capability; and sending, by the first access network device, a first message to a second access network device, where the first message carries the reflective QoS capability information of the terminal device.

In a possible implementation, before the sending, by the first access network device, a first message to a second access network device, the method further includes:

receiving, by the first access network device, first reflective QoS information from a core network device, where the first reflective QoS information is used to indicate a QFI for performing reflective QoS by the terminal device and a reflective QoS attribute RQA corresponding to the QFI.

In a possible implementation, the first message further carries second reflective QoS information, and the first reflective QoS information is used to indicate the QFI and the RQA corresponding to the QFI.

In a possible implementation, the first access network device receives first notification control information from the second access network device, where the first notification control information indicates a defect QFI that is in a guaranteed bit rate GBR QoS parameter for a bearer or a split bearer corresponding to the second access network device and that does not meet a preset GBR QoS parameter, and a GBR QoS parameter that corresponds to the defect QFI and that does not meet the preset GBR QoS parameter, and the GBR QoS parameter includes a GFBR and an MFBR.

In a possible implementation, the first access network device hands over a GBR QoS flow corresponding to the defect QFI from a bearer or a split bearer corresponding to the second access network device to a bearer or a split bearer corresponding to the first access network device: or the first access network device sends second notification control information to the core network device, where the second notification control information indicates the defect QFI, and the GBR QoS parameter that corresponds to the defect QFI and that does not meet the preset GBR QoS parameter.

A fourteenth aspect of the embodiments of this application further provides a communication method, including:

receiving, by a second access network device, a first message from a first access network device, where the first message carries reflective QoS capability information of a terminal device, and the reflective QoS capability information indicates that the terminal device has or does not have a reflective QoS capability; and if the reflective QoS capability information indicates that the terminal device has a reflective QoS capability, sending, by the second access network device to the terminal device, a data packet that carries a QFI.

In a possible implementation, the first message further carries reflective QoS information, and the reflective QoS information is used to indicate a QFI for performing reflective QoS by the terminal device and an RQA corresponding to the QFI.

In a possible implementation, the second access network device sends first notification control information to the first access network device when determining that a GBR QoS parameter for a bearer or a split bearer corresponding to the second access network device does not meet a preset GBR QoS parameter, where the first notification control information is used to indicate a defect QFI that does not meet the preset GBR QoS parameter, and a GBR QoS parameter that corresponds to the defect QFI and that does not meet the preset GBR QoS parameter.

BRIEF DESCRIPTION OF DRAWINGS

To describe the technical solutions in the embodiments of this application or in the background more clearly, the following describes the accompanying drawings required for the embodiments of this application or the background.

DESCRIPTION OF EMBODIMENTS

The following describes the embodiments of this application with reference to the accompanying drawings in the embodiments of this application.

Figure 1:
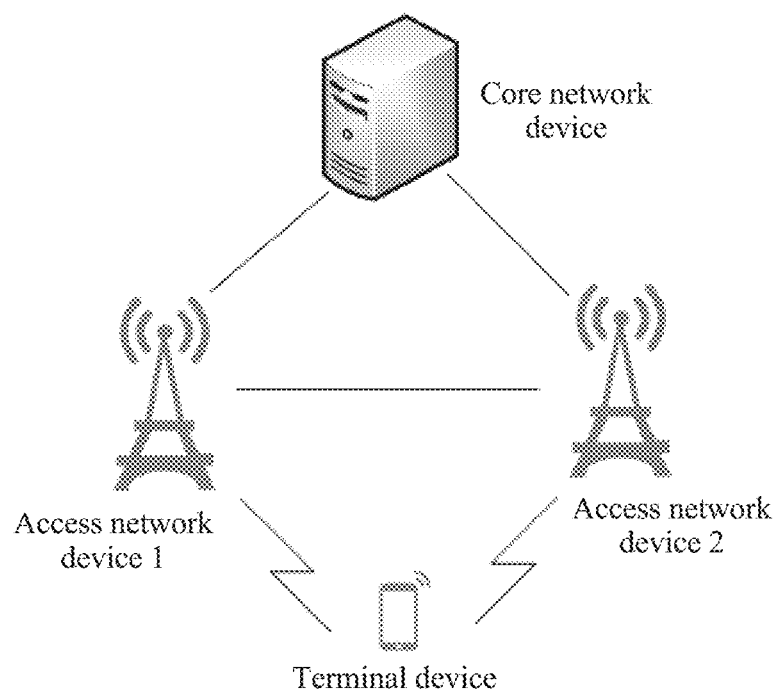
FIG. 1 is a schematic diagram of a network architecture to which the embodiments of this application are applied.

The embodiments of this application may be applied to a schematic diagram of a network architecture shown in FIG. 1. The network architecture shown in FIG. 1 is a network architecture of a wireless communications system, and usually includes a terminal device, an access network device, and a core network device. A quantity and forms of devices do not constitute a limitation on the embodiments of this application. The access network device may be a base station (Base Station, BS), the base station may provide a communications service for a plurality of terminal devices, and a plurality of base stations may provide a communications service for a same terminal device. In an embodiment, the base station includes a baseband unit (baseband unit, BBU) and a remote radio unit (remote radio unit, RRU). The BBU and the RRU may be placed in different places, for example, the RRU is remote and is placed in an open area near heavy traffic, and the BBU is placed in a central equipment room. Alternatively, the BBU and the RRU may be placed in a same equipment room. Alternatively, the BBU and the RRU may be different components in a same rack.

It should be noted that the wireless communications system mentioned in the embodiments of this application includes but is not limited to a Narrowband Internet of Things (narrow band-internet of things, NB-IoT) system, a Global System for Mobile Communications (global system for mobile communications, GSM), an Enhanced Data rates for GSM Evolution (enhanced data rate for GSM evolution, EDGE) system, a Wideband Code Division Multiple Access (wideband code division multiple access, WCDMA) system, a Code Division Multiple Access 2000 (code division multiple access, CDMA2000) system, a Time Division-Synchronous Code Division Multiple Access (time divisionsynchronization code division multiple access, TD-SCDMA) system, a Long Term Evolution (long term evolution, LTE) System, a 5th generation (5th-generation, 5G) mobile communications system, and a future mobile communications system.

In the embodiments of this application, the base station is an apparatus that is deployed in a radio access network and that is configured to provide a wireless communication function for a terminal device. The base station may include macro base stations, micro base stations (also referred to as small cells), relay stations, access points, transmission receiver points (transmission receiver point, TRP), and the like in various forms. In systems using different radio access technologies, devices with a base station function may have different names. For example, in a 3rd generation (3rd-generation, 3G) system, such a device is referred to as a NodeB (NodeB, NB); in the LTE system, such a device is referred to as an evolved NodeB (evolved NodeB, eNB or eNodeB): in the 5G system, such a device is referred to as a gNB. For ease of description, in all the embodiments of this application, the apparatus that provides the wireless communication function for the terminal device is collectively referred to as the access network device.

With an increasing requirement of a user for wireless communication and rapid growth of network traffic, network deployment becomes more intensive, and evolution of macro base stations and small cells is considered. Wide application of small cells and a corresponding non-ideal reverse backhaul requirement lead to a dual connectivity (dual connectivity, DC) technology, to be specific, a carrier aggregation manner in which a terminal device is connected to both a macro base station and a small cell.

In the Long Term Evolution (long term evolution. LTE) system, for a terminal device in a dual connectivity mode, only one SI-MME connection exists between one eNodeB and a mobility management entity (mobile management entity, MME). The eNodeB that provides the SI-MME connection may be referred to as a master evolved NodeB (master evolved nodeB, MeNB), and another eNodeB is configured to provide an additional resource, and may be referred to as a secondary evolved NodeB (secondary evolved nodeB. SeNB). Each eNodeB can independently manage the terminal device and a radio resource in a corresponding cell. Resource coordination between the master eNodeB and the secondary eNodeB is transmitted by using a signaling message in an X2 interface.

A primary base station may be an MeNB (master eNB), an MgNB (master gNB), or an MN (master NodeB). A secondary base station may be an SeNB (secondary eNB), an SgNB (secondary gNB), or an SN (secondary NodeB).

The terminal device in the embodiments of this application may include various user equipments (user equipment, UE), handheld devices, in-vehicle devices, wearable devices, or computing devices that have a wireless communication function, or other processing devices connected to a wireless modem. The terminal device may also be referred to as a mobile station (mobile station, MS) or a terminal (terminal), and may further include a subscriber unit (subscriber unit), a cellular phone (cellular phone), a smartphone (smart phone), a wireless data card, a personal digital assistant (personal digital assistant, PDA) computer, a tablet computer, a wireless modem (modem), a handheld device (handset), a laptop computer (laptop computer), a machine type communication (machine type communication, MTC) terminal, and the like. For ease of description, the devices mentioned above are collectively referred to as the terminal device in all the embodiments of this application.

The core network device in the embodiments of this application may be a core network device in the 5G system, and may include a user plane control function (user plane function. UPF) device, a control plane control function (control plane function, CPF) device, a device session management function (session management function, SMF) device, an access and mobility management function (access and mobility management function, AMF) device, and the like.

Figure 2A:
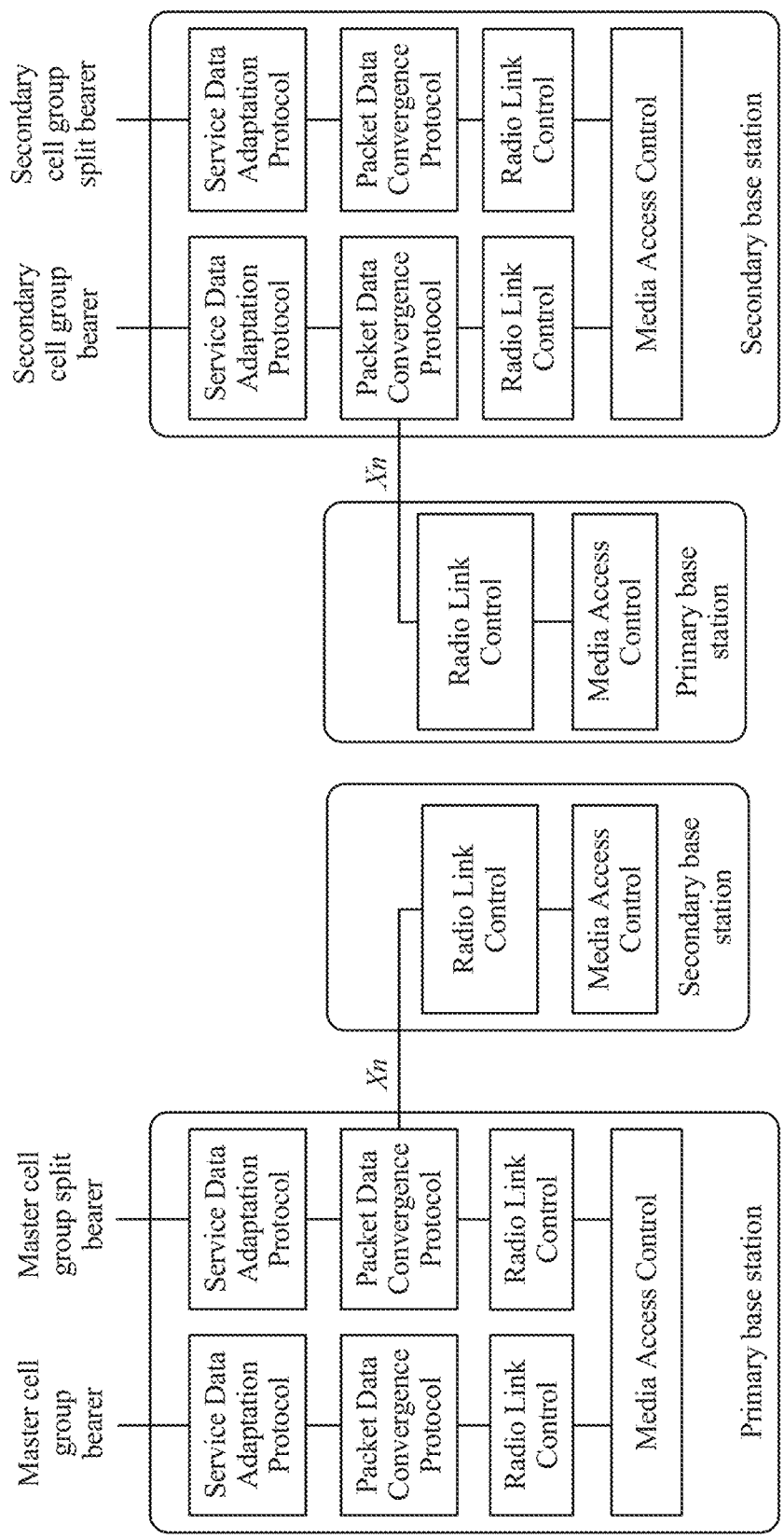
FIG. 2a is a schematic diagram of a scenario to which the embodiments of this application are applied.
Figure 2B:
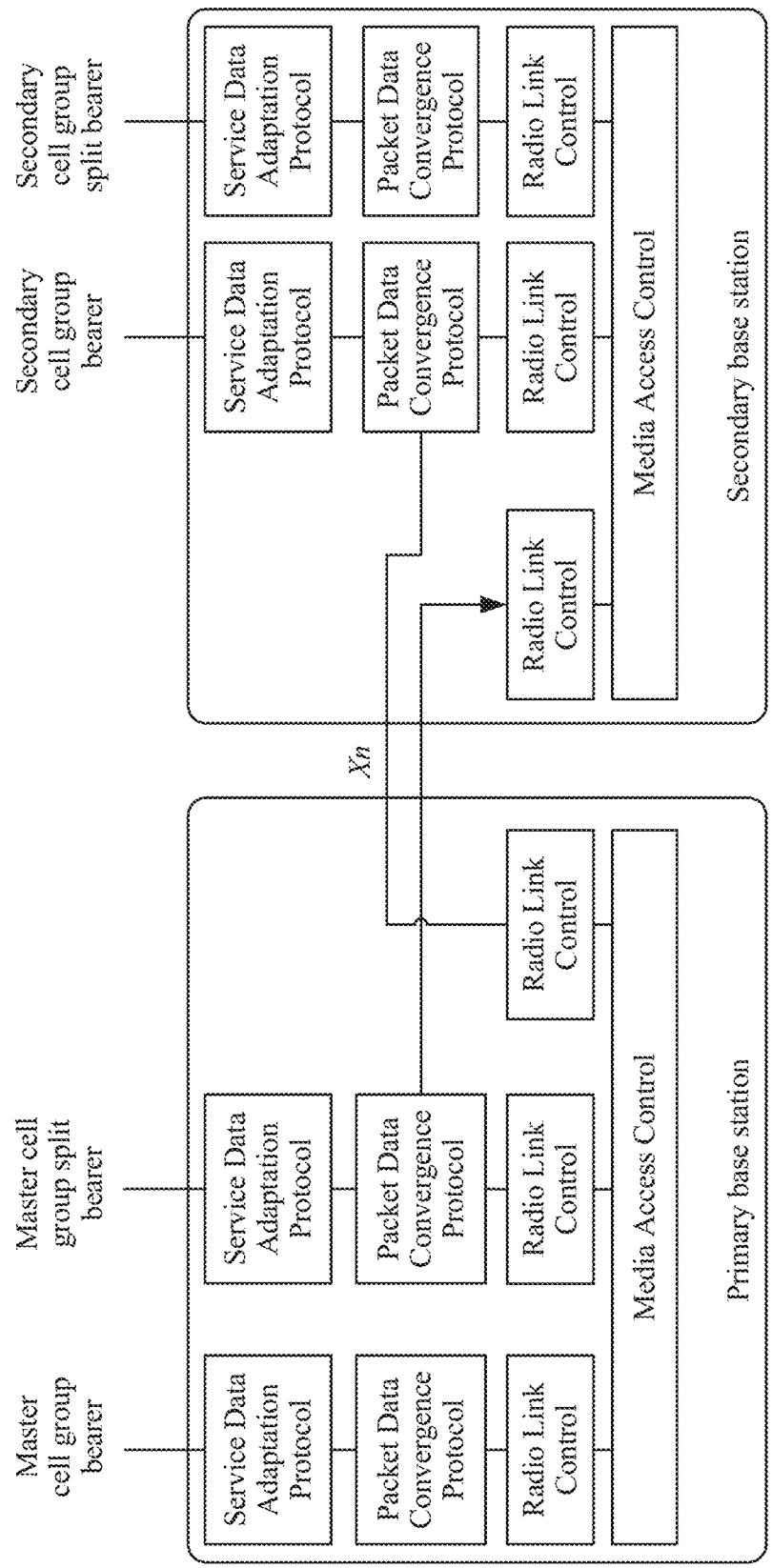
FIG. 2b is a schematic diagram of another scenario to which the embodiments of this application are applied.

The embodiments of this application may be applied to schematic diagrams of scenarios shown in FIG. 2a and FIG. 2b. FIG. 2a shows a new radio (new radio, NR)-NR dual connectivity scenario. To be specific, two access network devices are NR gNBs. The scenario can support four bearer types: a master cell group (master cell group, MCG) bearer (bearer) and an MCG split (split) bearer controlled by a master gNB, and a secondary cell group (secondary cell group, SCG) bearer and an SCG split bearer controlled by a secondary gNB. A QoS flow mapped to the MCG split bearer is processed by using the Service Data Adaptation Protocol (service data adaptation protocol, SDAP) and the Packet Data Convergence Protocol (packet data convergence protocol, PDCP), and is transmitted by using two paths. On one path, a QoS flow is transmitted to the SgNB by using an Xn interface, and is transmitted by the SgNB to a terminal device by using a Radio Link Control (radio link control, RLC) layer and a Media Access Control (media access control, MAC) layer. On the other path, a QoS flow is transmitted by the MgNB to the terminal device by using the RLC layer and the MAC layer. Likewise, a QoS flow mapped to the SCG split bearer is processed by using the PDCP, and is transmitted by using two paths. On one path, a QoS flow is transmitted to the MgNB by using an Xn interface, and is transmitted by the MgNB to the terminal device by using the RLC layer and the MAC layer. On the other path, a QoS flow is transmitted by the SgNB to the terminal device by using the RLC layer and the MAC layer.

FIG. 2b shows an NR-LTE dual connectivity scenario. To be specific, one access network device is an NR gNB, and the other access network device is an LTE eNodeB. In a scenario in which a primary base station is an LTE eNodeB, and a secondary base station is an NR gNB, the foregoing four bearer types can be supported. In a scenario in which a primary base station is an NR gNB, and a secondary base station is an LTE eNodeB, remaining three types other than the SCG split bearer can be supported. In the scenario shown in FIG. 2b, the two base stations are connected to a 5G core network.

It should be noted that both the scenarios shown in FIG. 2a and FIG. 2b are scenarios in which both the primary base station and the secondary base station are connected to the 5G core network. In a dual connectivity scenario, some QoS flows need to be transmitted by the secondary base station, and the secondary base station also needs to ensure parameter requirements of the QoS flows.

The following describes QoS flow-based parameters for a single connection in a 5G system:

Notification control (notification control) is usually used for a guaranteed bit rate (guaranteed bit rate, GBR) QoS flow. When an access network device cannot meet a performance parameter of the GBR QoS flow, the access network device notifies an SMF in a core network, so that the core network can perform a further operation (for example, instruct an application server to change an encoding rate).

A guaranteed flow bit rate (guaranteed flow bit rate. GFBR) is used for uplink and downlink GBR QoS flows, and indicates a bit rate that should be guaranteed for a GBR flow.

A maximum bit rate (maximum bit rate, MFBR) is used for uplink and downlink GBR QoS flows, and indicates a maximum bit rate available for a GBR flow. A part beyond the maximum bit rate is filtered out.

A session aggregate bit rate (per session aggregate maximum bit rate, Session-AMBR) is used for a non-GBR QoS flow. The session aggregate maximum bit rate limits bit aggregate values of all non-GBR QoS flows that can be provided by a protocol data unit (protocol data unit, PDU) session of a terminal device. The session-AMBR is notified by a core network device to the access network device.

A user equipment aggregate bit rate (per user equipment aggregate maximum bit rate, UE-AMBR) is used for a non-GBR QoS flow. The user equipment aggregate maximum bit rate limits bit aggregate values of all non-GBR QoS flows that can be provided by a terminal device.

It should be noted that, in the embodiments of this application, a first access network device is a base station connected to a core network device, and is a primary base station in a dual connectivity scenario, and a second access network device is a secondary base station in the dual connectivity scenario, and is not connected to the core network device.

Currently, a dual connectivity technology may also be used in the 5G system, but because there is a difference between QoS frameworks in the 5G system and an LTE system, how to transmit QoS information in the 5G system is an urgent problem to be resolved.

In view of this, the embodiments of this application further provide a communication method and an access network device, so as to implement QoS control in a 5G system, and further implement QoS information transmission between a primary base station and a secondary base station.

Figure 3:
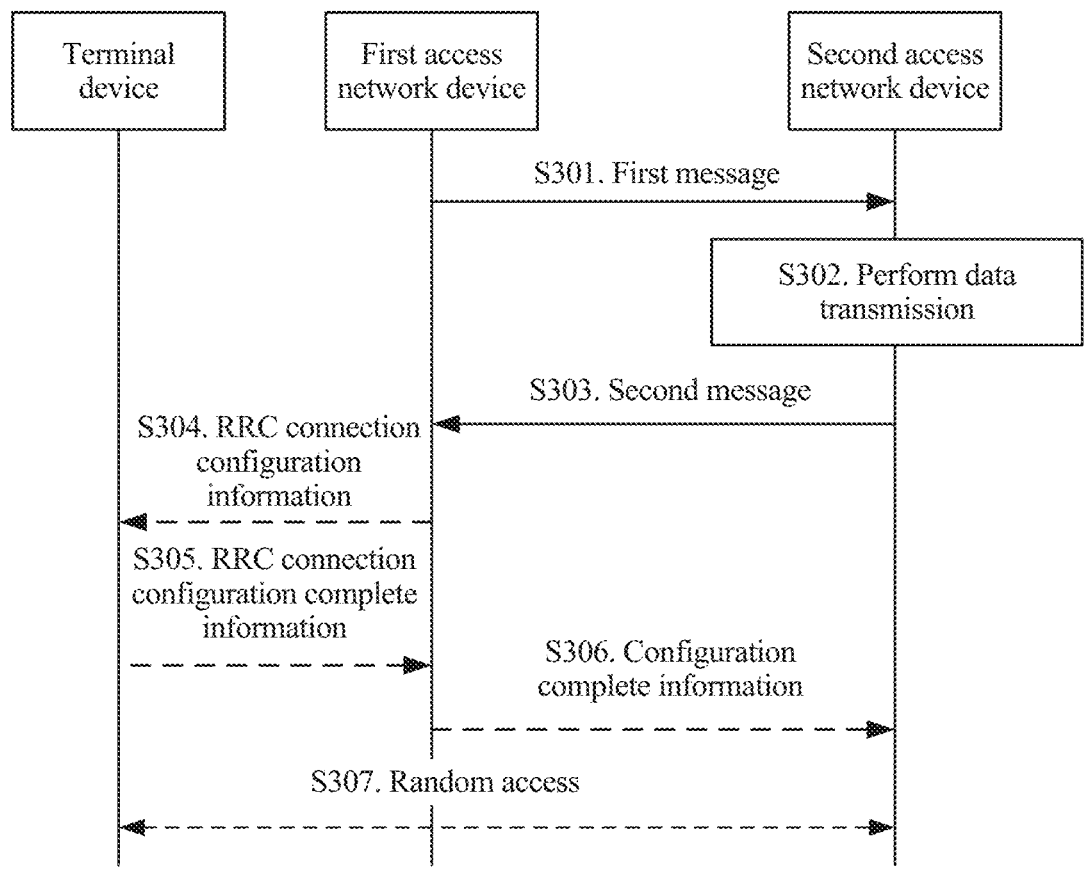
FIG. 3 is a schematic communication diagram of a communication method according to an embodiment of this application.

Referring to FIG. 3, FIG. 3 is a schematic communication diagram of a communication method according to an embodiment of this application. The method is described from a perspective of interaction between a first access network device and a second access network device, and the method may include but is not limited to the following steps.

Step S301: The first access network device sends a first message to the second access network device. Correspondingly, the second access network device receives the first message from the first access network device.

The first message carries a QFI for a split bearer corresponding to the first access network device and a QoS parameter corresponding to the QFI, that is, carries a QFI for an MCG split bearer and a QoS parameter corresponding to the QFI. The QoS parameter may be a QoS flow parameter, and the QoS flow parameter is used as an example for description in all the embodiments of this application.

When the first access network device corresponds to a plurality of split bearers, the first message further carries QFIs for the plurality of split bearers corresponding to the first access network device and QoS parameters corresponding to the QFIs.

Optionally, the first message further includes other content. Refer to Table 1.

TABLE 1

| >split bearer list |   |
| --- | --- |
| >>PDU session ID |   |

TABLE 1-continued

| >>MCG split bearer ID | M |
| --- | --- |
| >>QoS flows parameters | M |

For QoS flows parameters, refer to Table 2.

TABLE 2

| IE/Group Name | Presence |
| --- | --- |
| 5QI | M |
| Allocation and Retention Priority | M |
| Non-standardised QoS Flow descriptor | O |
| GBR QoS Flow Information | O |

GBR QoS flow information includes a GFBR (SN GFBR) that the second access network device needs to meet and an MFBR (SN MFBR) that the second access network device needs to meet. The SN GFBR includes an uplink SN GFBR and a downlink SN GFBR, and the SN MFBR includes an uplink SN MFBR and a downlink SN MFBR. Refer to Table 3.

TABLE 3

| SN Maximum Flow Bit Rate Downlink | M |
| --- | --- |
| SN Maximum Flow Bit Rate Uplink | M |
| SN Guaranteed Flow Bit Rate Downlink | M |
| SN Guaranteed Flow Bit Rate Uplink | M |

In Table 1, Table 2, and Table 3, "M" indicates that information corresponding to the item is mandatory, and "O" indicates that information corresponding to the item is optional.

Optionally, the SN GFBR and the SN MFBR may be defined by the first access network device, or may be determined by the first access network device and the second access network device through negotiation. For example, a primary base station sends a first SN GFBR and a first SN MFBR to a secondary base station, and the secondary base station considers that the two values are inappropriate, and may update the two values and send an updated second SN GFBR and an updated second SN MFBR to the primary base station. In this way, the secondary base station can be more active, and system flexibility is improved.

Step S302: The second access network device performs data transmission based on a QFI for a split bearer corresponding to the first access network device and a QoS parameter corresponding to the QFI.

Optionally, the second access network device may determine a priority of the QFI based on the QFI for the split bearer corresponding to the first access network device and the QoS flow parameter corresponding to the QFI, perform processing such as Media Access Control (media access control, MAC) scheduling and resource allocation based on the priority, and then transmit processed data.

Step S303: The second access network device sends a second message to the first access network device. Correspondingly, the first access network device receives the second message from the second access network device.

Optionally, the second message includes a QFI for a split bearer corresponding to the second access network device and a QoS parameter corresponding to the QFI.

Optionally, the first access network device receives, from the second access network device, the QFI for the split bearer corresponding to the second access network device and the QoS parameter corresponding to the QFI. The second message is used to respond to the first message.

When the first access network device corresponds to a plurality of split bearers, the first message further carries QFIs for the plurality of split bearers corresponding to the first access network device and QoS parameters corresponding to the QFIs.

Optionally, the second message further includes other content. Refer to Table 4-1.

TABLE 4-1

| >split bearer list | |
|---|---|
| >>PDU session ID | |
| >>SCG split bearer ID | M |
| >>QoS flows parameters | M |

For QoS flows parameters, refer to Table 2. The QFI for the split bearer corresponding to the second access network device and the QoS parameter corresponding to the QFI are similar to the QFI for the split bearer corresponding to the first access network device and the QoS parameter corresponding to the QFI. A difference lies in that a GBR QoS parameter for the split bearer corresponding to the second access network device includes a GFBR (MN GFBR) of the first access network device and an MFBR (MN MFBR) of the first access network device. Refer to Table 4-2.

TABLE 4-2

| MN Maximum Flow Bit Rate Downlink | M |
|---|---|
| MN Maximum Flow Bit Rate Uplink | M |
| MN Guaranteed Flow Bit Rate Downlink | M |
| MN Guaranteed Flow Bit Rate Uplink | M |

The first access network device performs data transmission based on the QFI for the split bearer corresponding to the second access network device and the QoS parameter corresponding to the QFI. This is similar to the case in which the second access network device performs data transmission based on the QFI for the split bearer corresponding to the first access network device and the QoS parameter corresponding to the QFI.

It should be noted that the first message may carry the QFI for the split bearer corresponding to the second access network device and the QoS parameter corresponding to the QFI, or may not carry the QFI for the split bearer corresponding to the second access network device and the QoS parameter corresponding to the QFI.

In the embodiment shown in FIG. 3, the first message may be specifically SGNB Addition Request or SGNB Modification Request, and the second message may be specifically SGNB Addition Acknowledge or SGNB Modification Acknowledge.

In the embodiment shown in FIG. 3, the primary base station can transmit a QoS parameter for an MCG bearer to the secondary base station, so that the secondary base station performs data transmission based on the QoS parameter for the MCG bearer.

In an optional embodiment, the first message further carries a mapping relationship between a bearer and/or a split bearer corresponding to the first access network device and a QoS parameter. The second access network device transmits, with reference to the mapping relationship between a bearer and/or a split bearer corresponding to the first access network and a QoS parameter, a QoS flow received from the first access network device, to avoid a case in which QoS flows are out of order when transmission of QoS flows of the first access network device has not ended.

The first message further carries a to-be-switched QFI and a QoS parameter corresponding to the to-be-switched QFI. The to-be-switched QFI may be a QFI of a QoS flow that the first access network device is to hand over to the second access network device.

Optionally, the second access network device may establish, based on the to-be-switched QFI and the QoS parameter corresponding to the to-be-switched QFI, a bearer corresponding to the second access network device and a mapping relationship between the bearer corresponding to the second access network device and the QoS parameter corresponding to the to-be-switched QFI, to avoid data transmission interruption.

Optionally, if the first access network device allows a bearer corresponding to the first access network device to switch to the split bearer corresponding to the second access network device, the first message carries the to-be-switched QFI, the QoS parameter corresponding to the to-be-switched QFI, and the mapping relationship between a bearer or a split bearer corresponding to the first access network device and a QoS parameter.

In an optional embodiment, the embodiment shown in FIG. 3 further includes a dashed line part shown in FIG. 3.

Figure 4:
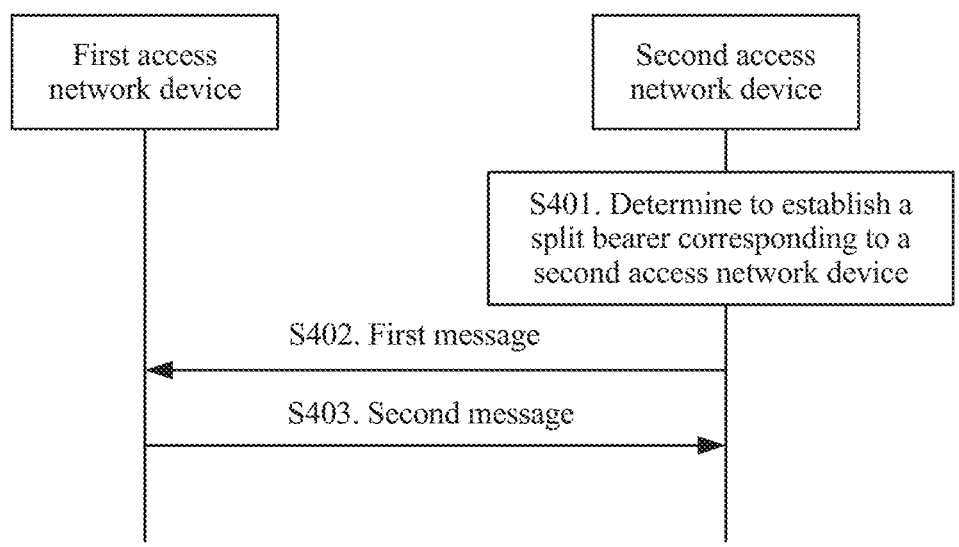
FIG. 4 is a schematic communication diagram of another communication method according to an embodiment of this application.

Referring to FIG. 4, FIG. 4 is a schematic communication diagram of another communication method according to an embodiment of this application. The method is described from a perspective of interaction between a first access network device and a second access network device, and the method may include but is not limited to the following steps.

Step S401: The second access network device determines to establish a split bearer corresponding to the second access network device.

Specifically, the second access network device independently determines to establish the split bearer corresponding to the second access network device. Optionally, the second access network device independently determines to establish a bearer corresponding to the second access network device.

Step S402: The second access network device sends a first message to the first access network device. Correspondingly, the first access network device receives the first message from the second access network device.

The first message carries a QFI for the split bearer corresponding to the second access network device and a QoS parameter corresponding to the QFI.

Optionally, the first access network device performs data transmission based on the QFI for the split bearer corresponding to the second access network device and the QoS parameter corresponding to the QFI. Refer to the description in the embodiment shown in FIG. 3.

Step S403: The first access network device sends a second message to the second access network device. Correspondingly, the second access network device receives the second message from the first access network device.

The second message is used to respond to the first message.

In the embodiment shown in FIG. 4, the first message may be specifically SGNB Modification Require, and the second message may be specifically S SGNB Modification Confirm.

In the embodiment shown in FIG. 4, a secondary base station can independently establish an SCG split bearer, and transmit a QoS parameter for the SCG split bearer to a primary base station, so that the primary base station performs data transmission based on the QoS parameter for the SCG split bearer.

A reflective QoS mechanism is introduced to a 5G system, and is a method for obtaining an uplink data transmission QoS rule by a terminal device. A basic idea of the mechanism is that the terminal device derives the uplink data transmission QoS rule based on a downlink data packet. Each QoS rule includes a QoS flow identifier (quality of service flow identification, QFI), a packet filter, and a priority. Based on the reflective QoS method, the terminal device determines a mapping relationship between an uplink data packet and a QFI, so that a downlink data packet and an uplink data packet that meet a condition use a same QFI.

Currently, in the reflective QoS mechanism introduced to the 5G system, a downlink data packet sent to the terminal device carries a QFI, and the QFI is added to an air interface, so that the terminal device performs reflective QoS. A base station may determine, based on indication information sent by a core network device, whether to trigger reflective QoS. To be specific, in one case, the base station receives, from the core network device, a data packet that carries a reflective QoS indication (reflective QoS indication, RQI), and considers that reflective QoS is to be triggered for the data packet; in another case, the base station receives signaling for reflective QoS attributes (reflective QoS attribute, RQA) of some QoS flows from the core network device, and considers that reflective QoS is to be triggered for these QoS flows. However, the foregoing scenarios are single base station scenarios. In a dual connectivity scenario, a secondary base station needs to support reflective QoS, but currently there is no existing solution.

In view of this, the embodiments of this application provide a communication method and an access network device, so that a secondary base station can support reflective QoS.

It should be noted that, in the embodiments of this application, a first access network device is a base station connected to a core network device, and is a primary base station in a dual connectivity scenario, and a second access network device is a secondary base station in the dual connectivity scenario, and is not connected to the core network device.

Figure 5:
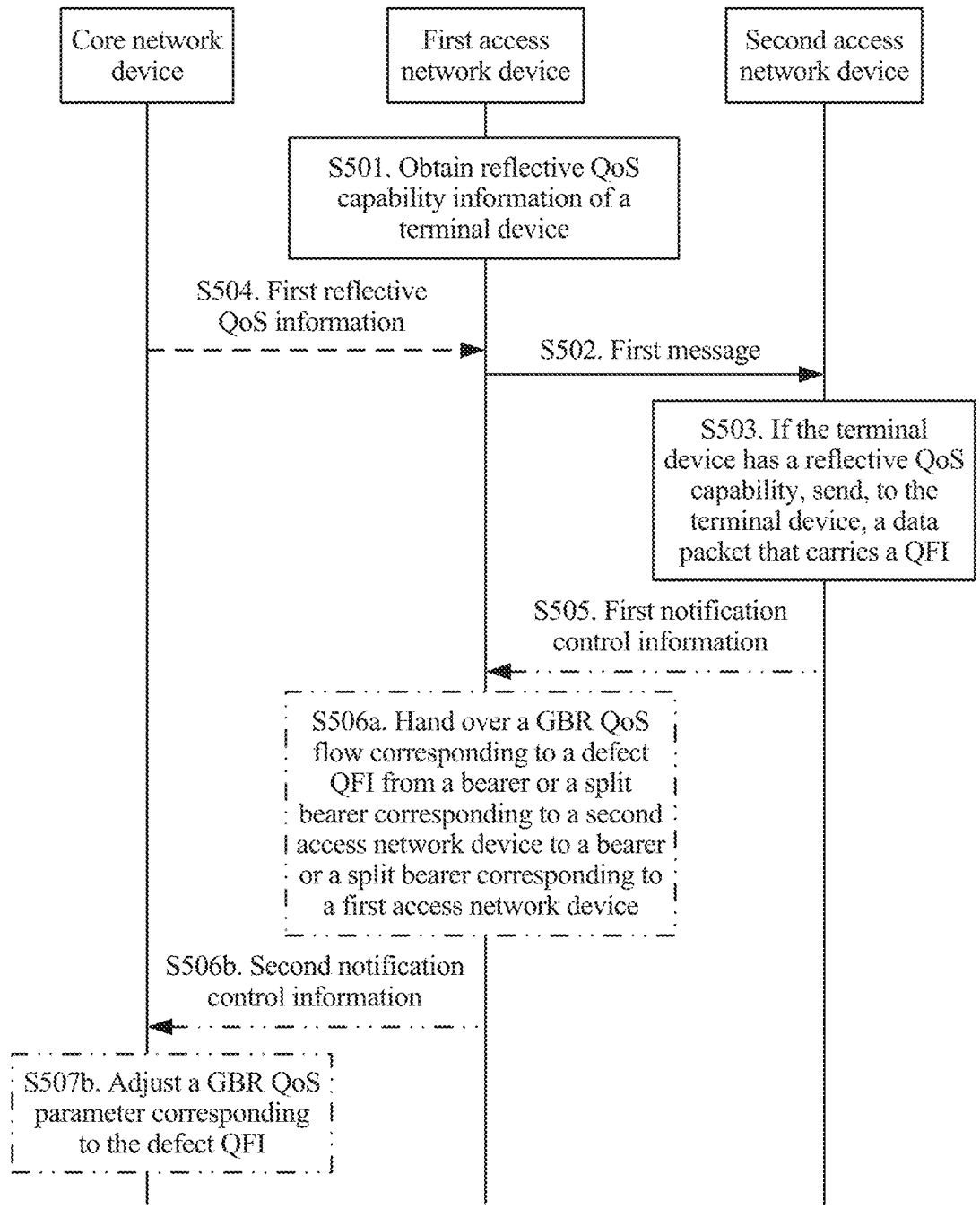
FIG. 5 is a schematic communication diagram of still another communication method according to an embodiment of this application.

Referring to FIG. 5, FIG. 5 is a schematic communication diagram of still another communication method according to an embodiment of this application. The method is described from a perspective of interaction between a first access network device, a second access network device, and a core network device, and the method may include but is not limited to the following steps.

Step S501: The first access network device obtains reflective QoS capability information of a terminal device, where the reflective QoS capability information indicates that the terminal device has or does not have a reflective QoS capability.

The terminal device is any one of one or more terminal devices connected to the first access network device, in other words, the terminal device falls within coverage of the first access network device.

In a possible implementation, the first access network device receives the reflective QoS capability indication information of the terminal device from the core network device, and the reflective QoS capability indication information indicates that the terminal device has or does not have a reflective QoS capability. The reflective QoS capability indication information of the terminal device may be carried in signaling sent by the core network device to the first access network device. Specific signaling is not limited in this embodiment of this application. In an implementation, a capability indication field may be used in the signaling to indicate a reflective QoS capability of the terminal device. For example, that the capability indication field is "0" indicates that the terminal device does not have a reflective QoS capability, and that the capability indication field is "1" indicates that the terminal device has a reflective QoS capability: or that the capability indication field is "1" indicates that the terminal device does not have a reflective QoS capability, and that the capability indication field is "0" indicates that the terminal device has a reflective QoS capability. A correspondence between the capability indication field and presence of a reflective QoS capability may be defined by a protocol between an access network device and the core network device, in other words, the correspondence is known to both the access network device and the core network device. In another implementation, a form of a character string (octet string) is used in the signaling to indicate a reflective QoS capability of the terminal device.

In a possible implementation, the first access network device obtains the reflective QoS capability indication information of the terminal device from the terminal device. Optionally, the terminal device may send the reflective QoS capability indication information to the first access network device at a moment, so that the first access network device obtains the reflective QoS capability indication information of the terminal device, and determines, based on the reflective QoS capability indication information, that the terminal device has or does not have a reflective QoS capability. The reflective QoS capability indication information of the terminal device may be carried in control information, and the control information may be a radio resource control (radio resource control, RRC) UE capability information message, or may be other control information in a 5G system or a future communications system. Likewise, a capability indication field may be used in the control information to indicate a reflective QoS capability of the terminal device. A correspondence between the capability indication field and presence of a reflective QoS capability may be defined by a protocol between an access network device and the terminal device, in other words, the correspondence is known to both the access network device and the terminal device.

Step S502: The first access network device sends a first message to the second access network device. Correspondingly, the second access network device receives the first message from the first access network device.

The first message carries the reflective QoS capability information of the terminal device.

Optionally, the first access network device sends the first message to the second access network device by using a communications interface between network devices, and the first message carries the reflective QoS capability information of the terminal device.

In a possible implementation, when determining to add the second access network device for the terminal device, the first access network device sends the first message to the second access network device, and in this case, the first message is an addition request message, and may be specifically SGNB Addition Request.

Optionally, the first access network device determines, based on a measurement result fed back by the terminal device, whether to add the second access network device for the terminal device. The added second access network device is configured to serve the terminal device, and can implement dual connectivity.

For example, if the first access network device determines, based on the measurement result fed back by the terminal device, that a signal of the terminal device for the second access network device is relatively strong or the terminal device is in an area covered by both a cell to which the first access network device belongs and a cell to which the second access network device belongs, the first access network device may determine to add the second access network device for the terminal device. Alternatively, the first access network device may determine, based on other information, whether to add the second access network device for the terminal device. A specific determining method is not limited in this embodiment of this application.

If the first access network device determines that the second access network device needs to be added for the terminal device, the first access network device may select, as the second access network device, an access network device from a cell adjacent to the cell to which the first access network device belongs, or may select an access network device as the second access network device based on the measurement result fed back by the terminal device.

In a possible implementation, when determining that the second access network device has served the terminal device, the first access network device sends the first message to the second access network device, and in this case, the first message is a modification request message, and may be specifically SGNB Modification Request.

Optionally, the first access network device determines, based on a measurement result fed back by the terminal device, whether the second access network device has served the terminal device. Alternatively, the first access network device may determine, by using another method, whether the second access network device has served the terminal device. A specific determining method is not limited in this embodiment of this application.

For the first message that carries the reflective QoS capability information of the terminal device, refer to Table 5. A UE reflective QoS capability is the reflective QoS capability information of the terminal device. The reflective QoS capability information of the terminal device may occupy 1 bit in the first message, and that the bit is "0" indicates that the terminal device does not have a reflective QoS capability, and that the bit is "1" indicates that the terminal device has a reflective QoS capability, or that the bit is "1" indicates that the terminal device does not have a reflective QoS capability, and that the bit is "0" indicates that the terminal device has a reflective QoS capability. A correspondence between the bit and presence of a reflective QoS capability may be defined by a protocol between access network devices, in other words, the correspondence is known to two access network devices interacting with each other. In another implementation, a form of a character string (Octet String) is used as the reflective QoS capability information to indicate a reflective QoS capability of the terminal device.

TABLE 5

| IE/Group Name | Presence |
| --- | --- |
| Message Type | M |
| MgNB UE XnAP ID | M |
| UE Security Capabilities | |
| SgNB Security Key | |
| SgNB UE Aggregate Maximum Bit Rate | M |
| UE reflective QoS capability | M |

"M" in Table 5 indicates that corresponding information is mandatory. It can be learned from Table 5 that the first message may further include other information. It may be understood that, in this embodiment of this application, the first message includes the UE reflective capability.

Correspondingly, the second access network device receives the first message from the first access network device.

Optionally, the second access network device receives the first message from the first access network device by using network devices, and the first message carries the reflective QoS capability information of the terminal device.

Step S503: If the reflective QoS capability information indicates that the terminal device has a reflective QoS capability, the second access network device sends, to the terminal device, a data packet that carries a QFI.

In a possible implementation, the reflective QoS capability information indicates that the terminal device has a reflective QoS capability, and the second access network device sends, to the terminal device in a first reflective QoS manner, the data packet that carries the QFI. Specifically, the second access network device receives the data packet from the core network device, adds the QFI and a reflective QoS indication (reflective QoS indication, RQI) to the data packet, and sends, to the terminal device by using an air interface, the data packet that carries the QFI. The second access network device receives the data packet from the core network device, and transmits the data packet on a bearer and a split bearer, that is, an SCG bearer and an SCG split bearer, corresponding to the second access network device.

In the data packet sent by the second access network device to the terminal device, the RQI may be used to instruct the terminal device to perform reflective QoS. The terminal device may add the QFI to an uplink data packet based on the RQI. A data radio bearer (data radio bearer, DRB) identifier may be used to indicate a DBR corresponding to a QoS flow corresponding to the QFI, and the DRB may be an SCG bearer and/or an SCG split bearer. The terminal device may map the uplink data packet to the DRB corresponding to the QoS flow corresponding to the QFI.

In a possible implementation, the reflective QoS capability information indicates that the terminal device has a reflective QoS capability, and the second access network device sends, to the terminal device in a second reflective QoS manner, the data packet that carries the QFI. Specifically, the second access network device receives the data packet from the core network device, adds the QFI to the data packet, and sends, to the terminal device by using an air interface, the data packet that carries the QFI. The second access network device receives the data packet from the core network device, and transmits the data packet on a bearer and a split bearer, that is, an SCG bearer and an SCG split bearer, corresponding to the second access network device.

In the data packet sent by the second access network device to the terminal device, an RQI may be used to instruct the terminal device to perform reflective QoS. The terminal device may add the QFI to an uplink data packet based on the RQI bit. A DBR identifier may be used to indicate a DRB corresponding to a QoS flow corresponding to the QFI, and the DRB may be an SCG bearer and/or an SCG split bearer. The terminal device may map the uplink data packet to the DRB corresponding to the QoS flow corresponding to the QFI.

Optionally, if the reflective QoS capability information indicates that the terminal device does not have a reflective QoS capability, the second access network device sends, to the terminal device, a data packet that does not carry the QFI.

In the embodiment shown in FIG. 5, when obtaining the reflective QoS capability indication information of the terminal device, the first access network device sends the reflective QoS capability indication information of the terminal device to the second access network device. In this way, a primary base station can indicate a reflective QoS capability of the terminal device, so that a secondary base station can support reflective QoS in a dual connectivity scenario, and therefore the secondary base station can better perform data transmission.

In an optional embodiment, the first message further carries second reflective QoS information, and the embodiment shown in FIG. 5 further includes:

Step S504: The core network device sends first reflective QoS information to the first access network device. Correspondingly, the first access network device receives the first reflective QoS information from the core network device.

The first reflective QoS information is used to indicate a QFI for performing reflective QoS by the terminal device and an RQA corresponding to the QFI.

It should be noted that there is more than one QFI, and a quantity of QFIs is related to a quantity of QoS flows, to be specific, one QoS flow corresponds to one QFI, and QFIs are used to identify different QoS flows. The QoS flow is a QoS flow transmitted by the core network device to the first access network device.

It should be noted that, if a data flow transmitted by the core network device to the first access network device has a QoS flow feature, the first reflective QoS information includes the RQA corresponding to the QFI; or if a data flow transmitted by the core network device to the first access network device does not have a QoS flow feature, the first reflective QoS information does not include the RQA corresponding to the QFI. The same is true of the second reflective QoS information.

When receiving the first reflective QoS information, the first access network device may send, to the terminal device in the two manners described in step S503, the data packet that carries the QFI.

It should be noted that, when the first message further carries the second reflective QoS information, step S504 is performed before step S502.

For parameter information of a QoS flow in the first message corresponding to the foregoing optional embodiment, refer to Table 6.

TABLE 6

| IE/Group Name | Presence | IE type and reference |
| --- | --- | --- |
| 5QI | M (FFS) | INTEGER (0 . . . 255) |
| Allocation and Retention Priority | M | <reference> |
| Non-standardised QoS Flow descriptor | O | <reference> |
| GBR QoS Flow information | O | 9.2.2 |
| Notification Control | O | ENUMERATED {notification requested . . . |
| RQA | O | |

5QI is a 5G QoS indicator (5G QoS indicator), and includes a QFI. In Table 2. "M" indicates that corresponding information is mandatory, and "O" indicates that corresponding information is optional. GBR QoS flow information (GBR QoS Flow Information) includes a GFBR and an MFBR.

In the foregoing optional embodiment 1, the first access network device can transmit a QoS parameter, including the QFI and the RQA corresponding to the QFI, to the second access network device.

In an optional embodiment, the embodiment shown in FIG. 5 further includes the following steps.

Step S505: The second access network device sends first notification control information to the first access network device. Correspondingly, the first access network device receives the first notification control information from the second access network device.

The first notification control information indicates a defect QFI that is in a GBR QoS parameter for a bearer or a split bearer corresponding to the second access network device and that does not meet a preset GBR QoS parameter, and a GBR QoS parameter that corresponds to the defect QFI and that does not meet the preset GBR QoS parameter. There may be more than one defect QFI. The notification control information may be notification control.

The GBR QoS parameter includes a GFBR, an MFBR, a delay, and the like. Correspondingly, the preset GBR QoS parameter includes a preset GFBR, a preset MFBR, a preset delay, and the like. The preset GBR QoS parameter may be defined by a protocol, in other words, the parameter is known to an access network device, the core network device, and the terminal device; or may be defined by the core network device. This is not limited. A specific value of the preset GBR QoS parameter is not limited in this embodiment of this application.

It may be understood that when a GBR QoS parameter corresponding to a QFI for an SCG bearer or an SCG split bearer does not meet the preset GBR QoS parameter, the secondary base station determines the QFI as a defect QFI, and determines a parameter that is in the GBR QoS parameter corresponding to the QFI and that does not meet the preset GBR QoS parameter. When at least one parameter in a GBR QoS parameter corresponding to a QFI does not meet a corresponding preset parameter, the QFI may be determined as a defect QFI.

In a possible implementation, the second access network device may independently determine the defect QFI and the GBR QoS parameter that corresponds to the defect QFI and that does not meet the preset GBR QoS parameter.

In a possible implementation, the second access network device may determine, based on a defect result reported by the terminal device, the defect QFI and the GBR QoS parameter that corresponds to the defect QFI and that does not meet the preset GBR QoS parameter. When detecting that a GBR QoS parameter for an SCG bearer or an SCG split bearer does not meet the preset GBR QoS parameter, and detecting a defect QFI, UE reports, to the secondary base station, the defect QFI and a QoS parameter that is in QoS parameters corresponding to the defect QFI and that does not meet the preset GBR QoS parameter. The reported message may be an RRC message or layer 2 signaling.

It should be noted that before step S505, step S502 may not need to be performed. The QoS parameter in step S505 may be a QoS flow parameter.

Step S506a: The first access network device hands over a GBR QoS flow corresponding to the defect QFI from a bearer or a split bearer corresponding to the second access network device to a bearer or a split bearer corresponding to the first access network device.

It may be understood that the primary base station hands over the GBR QoS flow corresponding to the defect QFI from an SCG bearer or an SCG split bearer to an MCG bearer or an MCG split bearer, and the primary base station transmits the GBR QoS flow corresponding to the defect QFI.

Step S506b: The first access network device sends second notification control information to the core network device. Correspondingly, the core network device receives the second notification control information.

The second notification control information indicates the defect QFI and the GBR QoS parameter that corresponds to the defect QFI and that does not meet the preset GBR QoS parameter.

It should be noted that if a GBR QoS parameter for a bearer or a split bearer corresponding to the first access network device does not meet the preset GBR QoS parameter, the first access network device may directly send notification control information to the core network device, to indicate a defect QFI and a GBR QoS parameter that corresponds to the defect QFI and that does not meet the preset GBR QoS parameter.

Step S507b: The core network device adjusts a GBR QoS parameter corresponding to the defect QFI.

A method for adjusting, by the core network device, the GBR QoS parameter corresponding to the defect QFI is not limited in this embodiment of this application.

In the foregoing optional embodiment, notification control information is used, so that the primary base station and the core network device further analyze a cause of a defect and perform corresponding adjustment.

Figure 6:
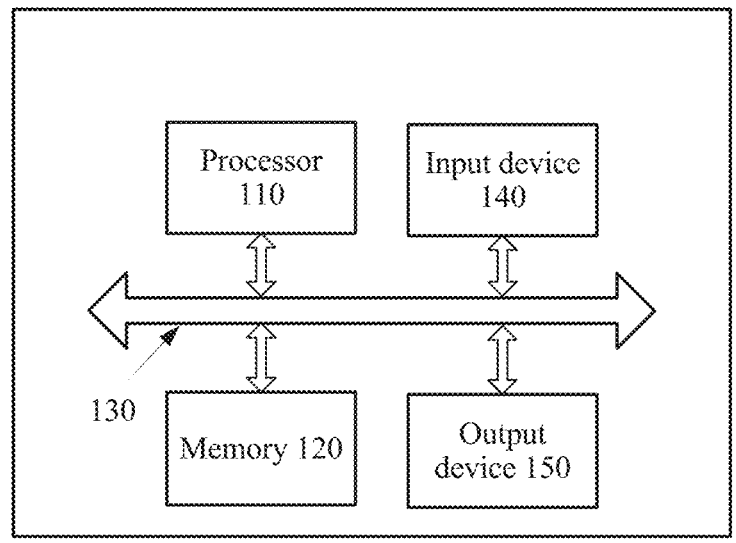
FIG. 6 is a schematic diagram 1 of a device according to an embodiment of this application.

According to the foregoing method. FIG. 6 is a schematic diagram 1 of a device according to an embodiment of this application. As shown in FIG. 6, the device may be a terminal device, or may be a chip or a circuit, for example, a chip or a circuit that may be disposed in a terminal device. The terminal device may correspond to the terminal device in the foregoing method.

The device may include a processor 110 and a memory 120. The memory 120 is configured to store an instruction, and the processor 110 is configured to execute the instruction stored in the memory 120, to perform the method corresponding to FIG. 3.

The device may further include an input device 140 and an output device 150. The device may further include a bus system 130. The processor 110, the memory 120, the input device 140, and the output device 150 may be connected by using the bus system 130.

The processor 110 is configured to execute the instruction stored in the memory 120, to control the input device 140 to receive a signal, and control the output device 150 to send a signal, to complete the steps of the terminal device in the foregoing method. The input device 140 and the output device 150 may be a same physical entity or different physical entities. When the input device 140 and the output device 150 are a same physical entity, the input device 140 and the output device 150 may be collectively referred to as an input/output port.

The memory 120 may be integrated into the processor 110, or may be separated from the processor 110.

In an implementation, it may be considered that functions of the input device 140 and the output device 150 are implemented by using a transceiver circuit or a dedicated transceiver chip. It may be considered that the processor 110 is implemented by using a dedicated processing chip, processing circuit, or processor, or a general-purpose chip.

In another implementation, it may be considered that the terminal device provided in this embodiment of this application is implemented by using a general-purpose computer. Program code that is used to implement functions of the processor 110, the input device 140, and the output device 150 is stored in the memory, and a general-purpose processor implements the functions of the processor 110, the input device 140, and the output device 150 by executing the code in the memory.

For a concept, an explanation, a detailed description, and other steps for the device that are related to the technical solution provided in this embodiment of this application, refer to the description about the content in the foregoing method or in another embodiment. Details are not described herein again.

Figure 7:
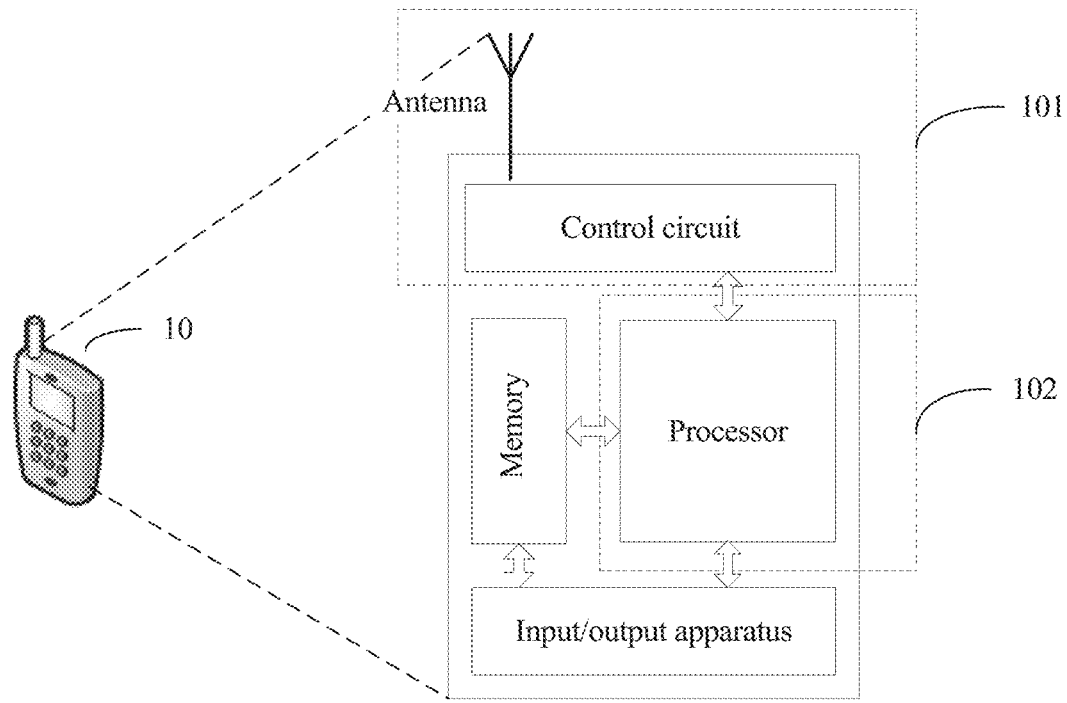
FIG. 7 is a schematic structural diagram of a terminal device according to this application.

FIG. 7 is a schematic structural diagram of a terminal device according to this application. The terminal device may be applied to the system shown in FIG. 1. For ease of description. FIG. 7 shows only main components of the terminal device. As shown in FIG. 7, the terminal device includes a processor, a memory, a control circuit, an antenna, and an input/output apparatus. The processor is mainly configured to: process a communication protocol and communication data, control the entire terminal device, execute a software program, and process data of the software program, for example, is configured to support the terminal device in performing the action described in the foregoing communication method embodiment. The memory is mainly configured to store a software program and data. The control circuit is mainly configured to: convert a baseband signal and a radio frequency signal, and process the radio frequency signal. The control circuit and the antenna may also be referred to as an input/output port, and the input/output port is mainly configured to send and receive a radio frequency signal of an electromagnetic wave form. The input/output apparatus, such as a touchscreen, a screen, or a keyboard, is mainly configured to: receive data entered by a user, and output data to the user.

After the terminal device is powered on, the processor may read the software program in the storage unit, explain and execute an instruction of the software program, and process data of the software program. When data needs to be sent in a wireless manner, the processor outputs a baseband signal to the radio frequency circuit after performing baseband processing on the to-be-sent data. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 7 shows only one memory and only one processor. An actual terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data, and the central processing unit is mainly configured to: control the entire terminal device, execute a software program, and process data of the software program. The processor in FIG. 7 integrates functions of the baseband processor and the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded in the processor, or may be stored in the storage unit in a form of a software program. The processor executes the software program to implement a baseband processing function.

For example, in this embodiment of this application, the antenna and the control circuit that have receiving and sending functions may be considered as a transceiver unit 101 of the terminal device, and the processor having a processing function may be considered as a processing unit 102 of the terminal device. As shown in FIG. 7, the terminal device includes the transceiver unit 101 and the processing unit 102. The transceiver unit may also be referred to as an input/output port, a transceiver, a transceiver apparatus, or the like. Optionally, a component that is in the transceiver unit 101 and configured to implement a receiving function may be considered as a receiving unit, and a component that is in the transceiver unit 101 and configured to implement a sending function may be considered as a sending unit. In other words, the transceiver unit 101 includes the receiving unit and the sending unit. For example, the receiving unit may also be referred to as a receiver, an input device, or a receiver circuit; the sending unit may be referred to as a transmitter, a transmitter device, or a transmitter circuit.

Figure 8:
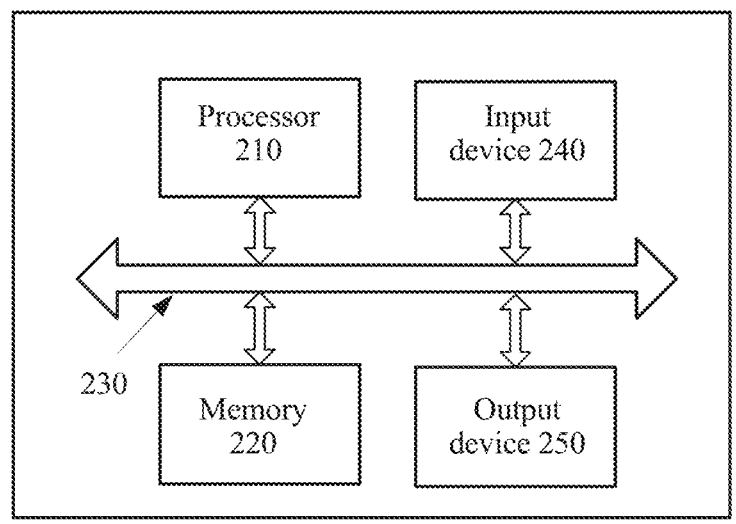
FIG. 8 is a schematic diagram 2 of a device according to an embodiment of this application.

According to the foregoing method, FIG. 8 is a schematic diagram 2 of a device according to an embodiment of this application. As shown in FIG. 8, the device may be a network device, or may be a chip or a circuit, for example, a chip or a circuit that may be disposed in a network device. The network device corresponds to the network device in the foregoing method. The device may include a processor 210 and a memory 220. The memory 220 is configured to store an instruction, and the processor 210 is configured to execute the instruction stored in the memory 220, so that the device performs the method corresponding to FIG. 3.

The network may further include an input device 240 and an output device 250. The network may still further include a bus system 230.

The processor 210, the memory 220, the input device 240, and the output device 250 are connected by using the bus system 230. The processor 210 is configured to execute the instruction stored in the memory 220, to control the input device 240 to receive a signal, and control the output device 250 to send a signal, to complete the steps of the network device in the foregoing method. The input device 240 and the output device 250 may be a same physical entity or different physical entities. When the input device 240 and the output device 250 are a same physical entity, the input device 240 and the output device 250 may be collectively referred to as an input/output port. The memory 220 may be integrated into the processor 210, or may be separated from the processor 210.

In an implementation, it may be considered that functions of the input device 240 and the output device 250 are implemented by using a transceiver circuit or a dedicated transceiver chip. It may be considered that the processor 210 is implemented by using a dedicated processing chip, processing circuit, or processor, or a general-purpose chip.

In another implementation, it may be considered that the network device provided in this embodiment of this application is implemented by using a general-purpose computer. Program code that is used to implement functions of the processor 210, the input device 240, and the output device 250 is stored in the memory, and a general-purpose processor implements the functions of the processor 210, the input device 240, and the output device 250 by executing the code in the memory.

For a concept, an explanation, a detailed description, and other steps for the device that are related to the technical solution provided in this embodiment of this application, refer to the description about the content in the foregoing method or in another embodiment. Details are not described herein again.

Figure 9:
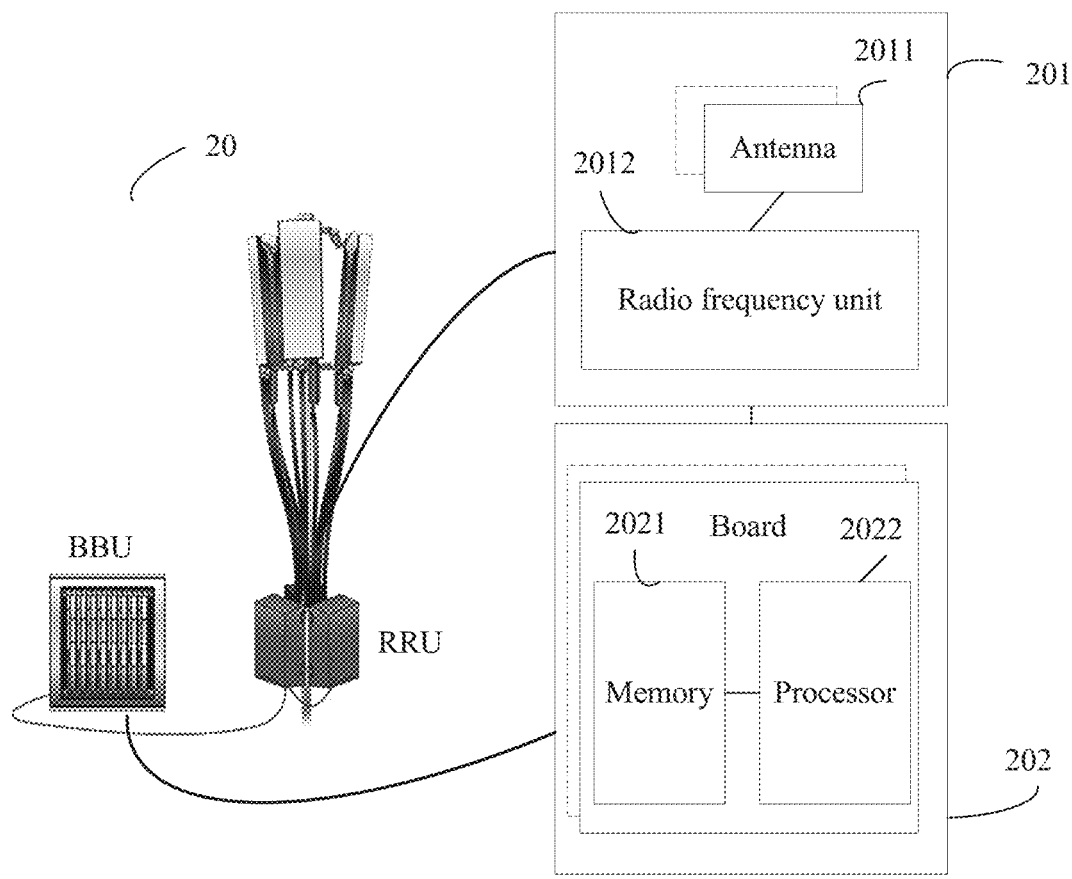
FIG. 9 is a schematic structural diagram of a network device according to an embodiment of this application.

According to the foregoing method, FIG. 9 is a schematic structural diagram of a network device according to an embodiment of this application, for example, may be a schematic structural diagram of a base station. As shown in FIG. 9, the base station may be applied to the system shown in FIG. 1. The base station includes one or more radio frequency units such as remote radio units (remote radio unit, RRU) 201 and one or more baseband units (baseband unit, BBU) (also referred to as a digital unit, digital unit, DU) 202. The RRU 201 may be referred to as a transceiver unit, a transceiver, a transceiver circuit, an input/output port, or the like, and may include at least one antenna 2011 and a radio frequency unit 2012. The RRU 201 is mainly configured to: send and receive a radio frequency signal and convert the radio frequency signal and a baseband signal. For example, the RRU 201 is configured to send the signaling message described in the foregoing embodiment to a terminal device. The BBU 202 is mainly configured to: perform baseband processing, control the base station, and the like. The RRU 201 and the BBU 202 may be physically disposed together, or may be physically separated, for example, in a distributed base station.

The BBU 202 is a control center of the base station, may be referred to as a processing unit, and is mainly configured to complete baseband processing functions such as channel coding, multiplexing, modulation, and spread spectrum. For example, the BBU (the processing unit) may be configured to control the base station to perform the operation procedure of the network device in the foregoing method embodiment.

For example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store a necessary instruction and necessary data. For example, the memory 2021 stores the preset information, the codebook, and the like described in the foregoing embodiment. The processor 2022 is configured to control the base station to perform necessary actions. For example, the processor 2022 is configured to control the base station to perform the operation procedure of the network device in the foregoing method embodiment. The memory 2021 and the processor 2022 may serve one or more boards. In other words, a memory and a processor may be separately disposed on each board. Alternatively, a plurality of boards may share a same memory and a same processor. In addition, a necessary circuit may be further disposed on each board.

According to the method provided in the embodiments of this application, an embodiment of this application further provides a communications system, and the system includes the foregoing network device and one or more terminal devices.

It should be understood that in the embodiments of this application, the processor may be a central processing unit (Central Processing Unit, "CPU" for short), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware assembly, or the like. The general-purpose processor may be a microprocessor, or the processor may be any conventional processor, or the like.

The memory may include a read-only memory and a random access memory, and provide an instruction and data for the processor. A part of the memory may further include a nonvolatile random access memory.

The bus system may include a power bus, a control bus, a status signal bus, and the like in addition to a data bus. However, for clarity of description, various buses are marked as the bus system in the figure.

In an implementation process, steps in the foregoing methods may be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be further understood that the first, the second, the third, the fourth, and various numbers in this specification are used for differentiation only for ease of description, instead of limiting the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that illustrative logical blocks (illustrative logical block) and steps (step) described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the system, apparatus, and unit, reference may be made to a corresponding process in the method embodiments. Details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a dedicated computer, a computer network, or another programmable apparatus. The computer instructions may be stored in a computer readable storage medium or may be transmitted from a computer readable storage medium to another. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
sending, by a first access network device, a first message to a second access network device, wherein the first message carries a first quality of service (QoS) flow identification (QFI) for a split bearer corresponding to the first access network device and a first QoS parameter corresponding to the first QFI;
receiving, by the first access network device, a second message from the second access network device, wherein the second message is a response to the first message, wherein the second message carries a second QFI for a split bearer corresponding to the second access network device and a second QoS parameter corresponding to the second QFI; and
in response to receiving the second message from the second access network device, performing, by the first access network device, data transmission based on a priority of the second QFI, the priority of the second QFI being determined based on the second QFI and the second QoS parameter.

2. The method according to claim 1, wherein the first QoS parameter corresponding to the first QFI for the split bearer corresponding to the first access network device comprises a guaranteed bit rate (GBR) QoS parameter, and wherein the GBR QoS parameter comprises a guaranteed flow bit rate (GFBR) that the second access network device needs to meet and a maximum flow bit rate (MFBR) that the second access network device needs to meet.

3. The method according to claim 1, wherein the first message further carries a mapping relationship between at least one of a bearer or a split bearer corresponding to the first access network device and a QoS parameter.

4. The method according to claim 3, wherein the first message further carries a to-be-switched QFI and a QoS parameter corresponding to the to-be-switched QFI.

5. The method according to claim 1, further comprising:
receiving, by the first access network device, a third message from the second access network device, wherein the third message carries a QFI for a split bearer corresponding to the second access network device and a QoS parameter corresponding to the QFI.

6. The method according to claim 1, wherein the second QoS parameter corresponding to the second QFI for the split bearer corresponding to the second access network device comprises a GBR QoS parameter, and wherein the GBR QoS parameter comprises a GFBR that the first access network device needs to meet and an MFBR that the first access network device needs to meet.

7. A communication method, comprising:
receiving, by a second access network device, a first message from a first access network device, wherein the first message carries a first quality of service (QoS) flow identification (QFI) for a split bearer corresponding to the first access network device and a first QoS parameter corresponding to the first QFI;
in response to receiving the first message from the first access network device, performing, by the second access network device, data transmission based on a priority of the first QFI, the priority of the first QFI being determined based on the first QFI and the first QoS parameter; and
sending, by the second access network device, a second message to the first access network device, wherein the second message is a response to the first message, and the second message comprising a second QFI for a split bearer corresponding to the second access network device and a second QoS parameter corresponding to the second QFI.

8. The method according to claim 7, wherein the first QoS parameter corresponding to the first QFI for the split bearer corresponding to the first access network device comprises a guaranteed bit rate (GBR) QoS parameter, and wherein the GBR QoS parameter comprises a guaranteed flow bit rate (GFBR) that the second access network device needs to meet and a maximum flow bit rate (MFBR) that the second access network device needs to meet.

9. The method according to claim 7, wherein the first message further carries a mapping relationship between at least one of a bearer or a split bearer corresponding to the first access network device and a QoS parameter; and
wherein the method further comprises:
transmitting, by the second access network device and by using the mapping relationship between a bearer or a split bearer corresponding to the first access network device and a QoS parameter, a QoS flow received from the first access network device.

10. The method according to claim 9, wherein the first message further carries a to-be-switched QFI and a QoS parameter corresponding to the to-be-switched QFI; and
wherein the method further comprises:
establishing, by the second access network device based on the to-be-switched QFI and the QoS parameter corresponding to the to-be-switched QFI, a bearer corresponding to the second access network device and a mapping relationship between the bearer corresponding to the second access network device and the QoS parameter corresponding to the to-be-switched QFI.

11. The method according to claim 7, further comprising:
determining, by the second access network device, to establish a split bearer corresponding to the second access network device; and
sending, by the second access network device, a third message to the first access network device, wherein the third message comprises a QFI for the split bearer corresponding to the second access network device and a QoS parameter corresponding to the QFI.

12. The method according to claim 7, wherein the second QoS parameter corresponding to the second QFI for the split bearer corresponding to the second access network device comprises a GBR QoS parameter, and wherein the GBR QoS parameter comprises a GFBR that the first access network device needs to meet and an MFBR that the first access network device needs to meet.

13. An apparatus, comprising:
at least one processor; and
a memory storing instructions executable by the at least one processor, wherein the instructions, when executed by the at least one processor, instruct the at least one processor to perform the following operations:
sending a first message to a second access network device, wherein the first message carries a first quality of service (QoS) flow identification (QFI) for a split bearer corresponding to a first access network device and a first QoS parameter corresponding to the first QFI;
receiving a second message from the second access network device, wherein the second message is a response to the first message, wherein the second message carries a second QFI for a split bearer corresponding to the second access network device and a second QoS parameter corresponding to the second QFI; and in response to receiving the second message from the second access network device, performing data transmission based on a priority of the second QFI, the priority of the second QFI being determined based on the second QFI and the second QoS parameter.

14. The apparatus according to claim 13, wherein the first QoS parameter corresponding to the first QFI for the split bearer corresponding to the first access network device comprises a guaranteed bit rate (GBR) QoS parameter, and wherein the GBR QoS parameter comprises a guaranteed flow bit rate (GFBR) that the second access network device needs to meet and a maximum flow bit rate (MFBR) that the second access network device needs to meet.

15. The apparatus according to claim 13, wherein the first message further carries a mapping relationship between at least one of a bearer or a split bearer corresponding to the first access network device and a QoS parameter.

16. The apparatus according to claim 13, wherein the first message further carries a to-be-switched QFI and a QoS parameter corresponding to the to-be-switched QFI.

* * * * *